United States Patent

[11] 3,596,161

[72] Inventors Roy L. Swanke
Newington;
Gordon H. Raymond, Southington, both of, Conn.
[21] Appl. No. 813,957
[22] Filed Apr. 7, 1969
[45] Patented July 27, 1971
[73] Assignee Dynamics Corporation of America
New York, N.Y.

[54] UNIVERSAL MOTOR SPEED CONTROL CIRCUITS
23 Claims, 26 Drawing Figs.
[52] U.S. Cl. .................................. 318/305,
318/252, 318/245, 318/351
[51] Int. Cl. .................................... H02p 7/12
[50] Field of Search ........................... 318/245,
252, 305, 351

[56] References Cited
UNITED STATES PATENTS
1,074,152  9/1913  Zabriskie ............... 318/245
3,286,150  11/1966  Wilson ................. 318/305
3,422,330  1/1969  Swanke ................. 318/305
3,493,833  2/1970  Swanke ................. 318/252

Primary Examiner—Oris L. Rader
Assistant Examiner—Thomas Langer
Attorney—Harbaugh and Thomas ABSTRACT: A speed controllable universal motor circuit having multiple independent field coils of different impedances permutated by switches which interconnect them and are actuated by individually operable pushbuttons of a slider permutation switch to provide a maximum number of possible predetermined circuit patterns for the field coils, with a minimum number of switches and of field coils for significantly different speeds at any one or more of which the motor may be energized continuously or intermittently by an additional pushbutton through one or more of the speed permutations that is provided when a stop switch is actuated.

PATENTED JUL 27 1971
3,596,161
SHEET 1 OF 4
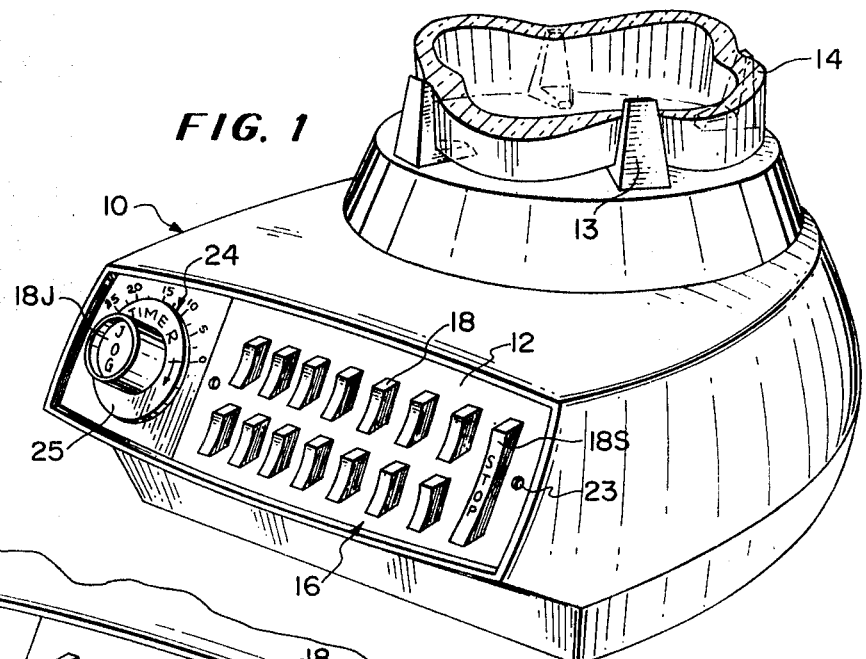
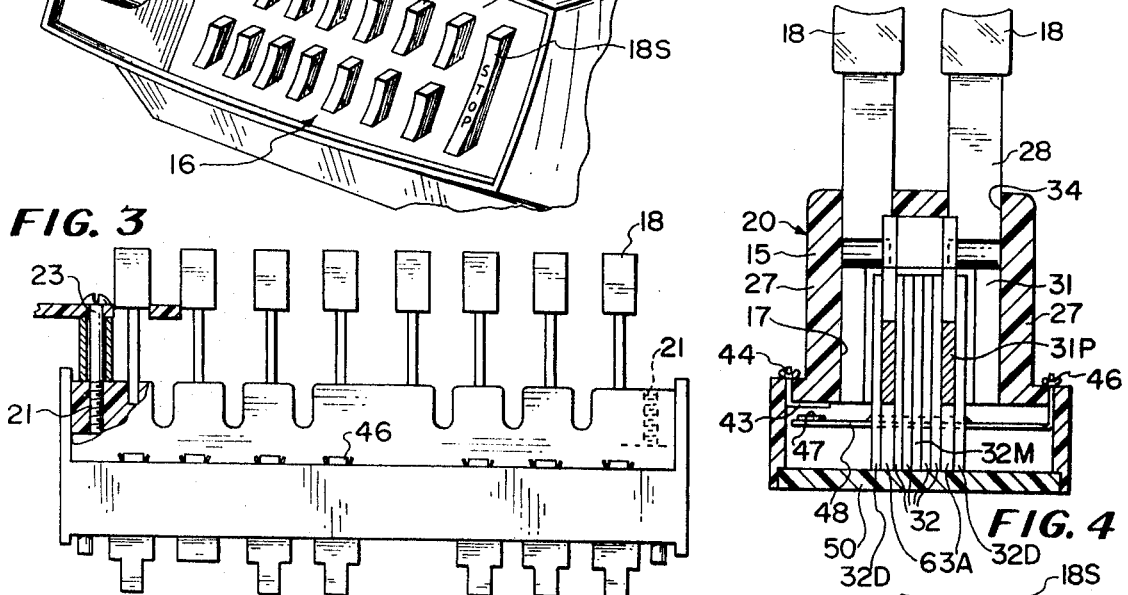
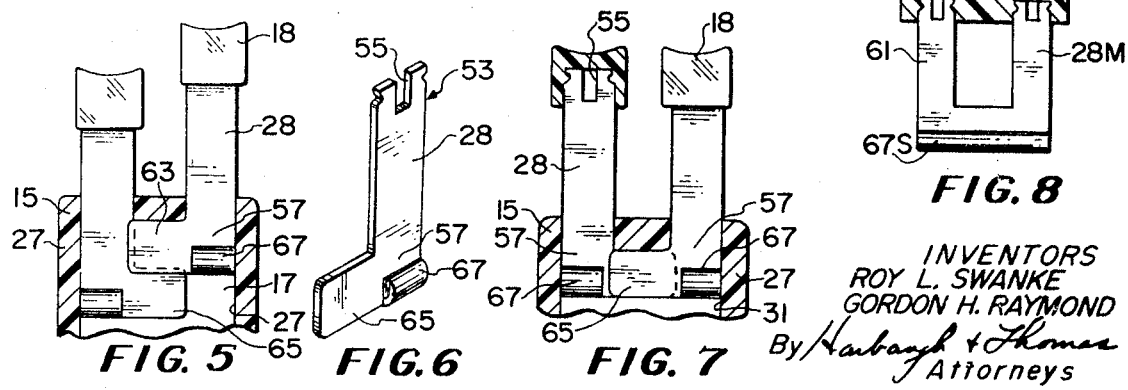
INVENTORS
ROY L. SWANKE
GORDON H. RAYMOND
By Haubaugh & Thomas
Attorneys

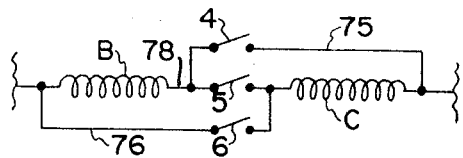
FIG. 9
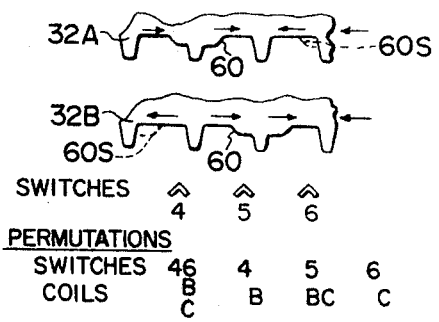
FIG. 10
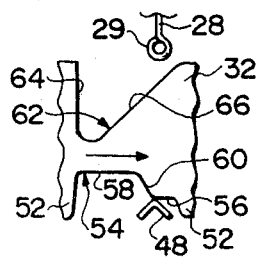
FIG. 11
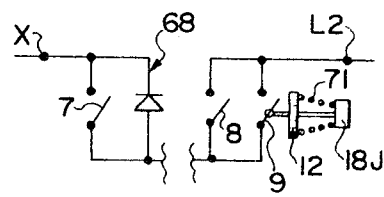
FIG. 14
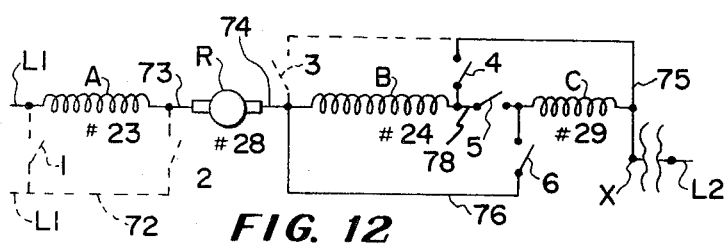
FIG. 12B
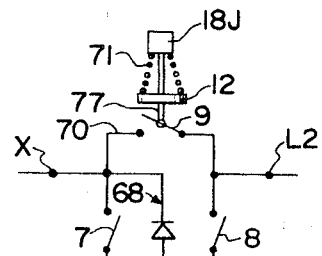
FIG. 15
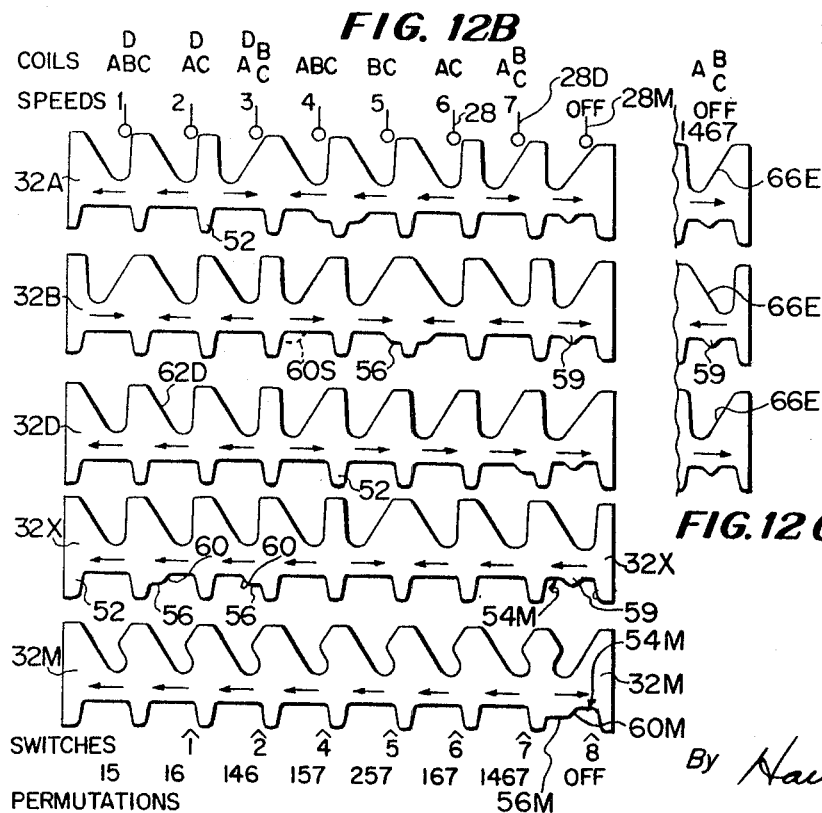
FIG. 12C
FIG. 16
INVENTORS
ROY L. SWANKE
GORDON H. RAYMOND
By Harbaugh & Thomas
Attorneys

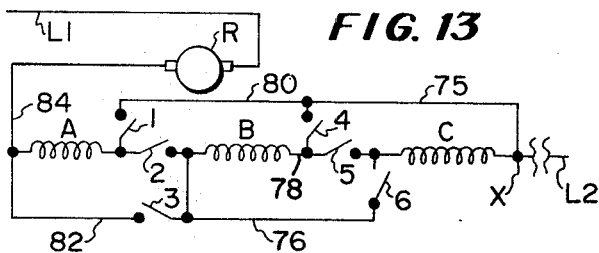
FIG. 13
FIG. 12A
POSSIBLE PERMUTATIONS
| COILS | SWITCHES CLOSED |
|---|---|
| ABC | 15 |
| BC | 25 |
| AC | 16 |
| AB | 14 |
| A B/C | 146 |
| B | 24 |
| C | 26 |
| B/C | 246 |
| STOP | 456 open |
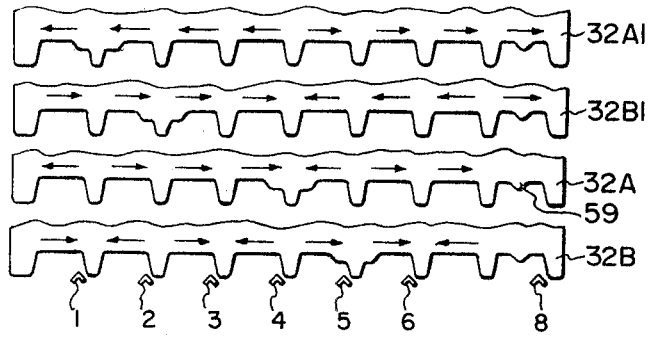
FIG. 13B
FIG. 13A
POSSIBLE PERMUTATIONS
| COILS | SWITCHES CLOSED |
|---|---|
| ABC | 25 |
| BC | 35 |
| AC | 26 |
| AB | 24 |
| A B/C | 246 |
| BC/A | 135 |
| A | 1 |
| B | 34 |
| C | 36 |
| B/C | 346 |
| A/B/C | 134 |
| A/C/B | 136 |
| A/B/C | 1346 |
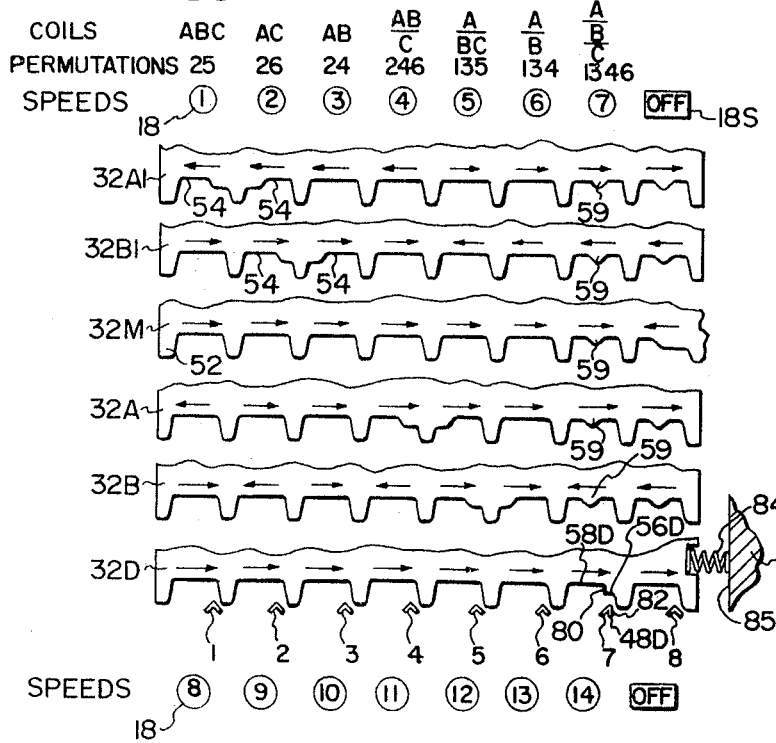
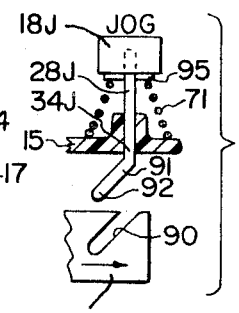
FIG. 13D
INVENTORS
ROY L. SWANKE
GORDON H. RAYMOND
By Harbaugh & Thomas
Attorneys

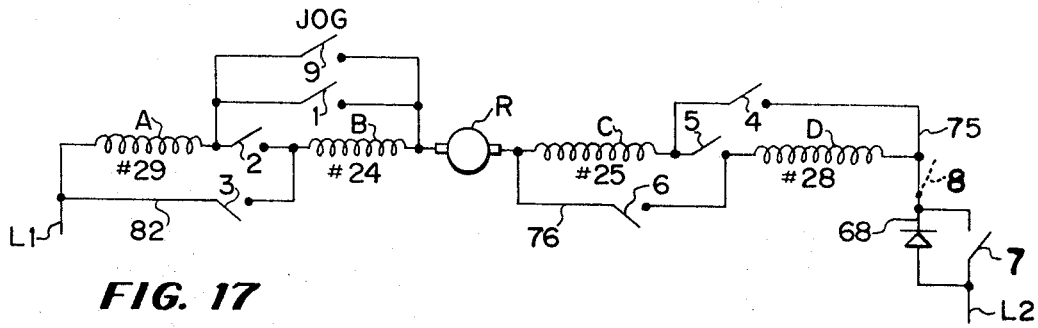
FIG. 17
FIG. 17A
| SPEEDS | COILS | SWITCHES |
|---|---|---|
| OFF | C/D | 467 |
| 1 | ABCD | 25 |
| 2 | ABC | 24 |
| 3 | AC | 14 |
| 4 | A/B C | 134 |
| 5 | AB C/D | 2467 |
| 6 | A C/D | 1467 |
| 7 | A/B C/D | 13467 |
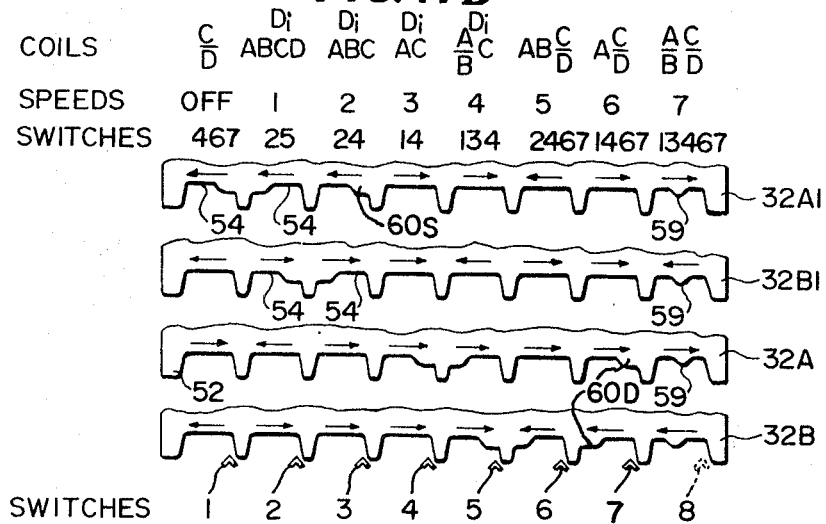
FIG. 17B
INVENTORS
ROY L. SWANKE
GORDON H. RAYMOND
By Harbaugh & Thomas
Attorneys

3,596,161

UNIVERSAL MOTOR SPEED CONTROL CIRCUITS

CROSS REFERENCES

SWANKE, Ser. No. 636,457 now U.S. Pat. No. 3,493,833
SWANKE and RAYMOND Ser. No. 766,280
SWANKE, Ser. No. 780,103
BULL, Ser. No. 508,309 now U.S. Pat. No. 3,440,438

BACKGROUND OF THE INVENTION

With increasing knowledge and research in laboratories and in food and drink preparation, definiteness of timing, agitation speeds and volumes of ingredients have become increasingly important in recipes or formulas for the optimum results when ingredients are being comminuted, mixed, homogenized or blended. Factors such as particle size, aeration, fluidity, weight and volume are not only concerned with exact timing but also a wide selection of accurately controlled specific speeds. Even then, variations in the quality of some ingredients or local low voltage conditions may vary the intended results and require correction. Accordingly, from time to time, either one or both of the last two factors may have to be supplemented by manually energizing or "jogging" the motor to visually attain the final results desired.

Universal motors having infinitely variable speed characteristics that are related to the relative impedance in the field and armature windings have the further characteristic of coming up to a selected speed very quickly which is particularly desirable in food liquidizers and for jogging. Furthermore they have an increasing torque characteristic which under an increasing load involves comparatively little slowup from a selected speed. Accordingly, recipes are written with exact ingredients and amounts for excellent constancy in the results with a particular mixing speed and time increment. A wide selection of speeds is desirable because of the wide range of ingredients handled, and as many speeds are provided as possible having significant differences.

In providing a wide spread of significantly different speeds, the same number of switches as there are speeds have heretofore been devoted to speed control with parallel or series and skip-coil connections since each field coil must have open connections at opposite ends in order to have an open end available so that any coil not in use will not be short circuited when other coils are connected in the working circuit. Multiple pushbutton switches have been used for this purpose in great numbers as electrical appliance controls for selected performance patterns, and with the need for an even greater number of speed control performance characteristics multiple switching with more and more buttons has increasingly been used in home and industry. However, in all of them two buttons are used in each operation, namely, a selected speed button to start and another one to stop the motor. This makes it difficult to "jog" the motor with short bursts of energization.

Space for a switch within the appliance and for multiple coils on the stator being problems as well as minimizing the increasing cost of greater appliance versatility, the desire for greater versatility and performance require either 1) a greater number of pushbuttons, 2) minimized number of switches, 3) minimized number of coils, 4) maximized differences in coil impedances, or, 5) increased switch permutations, or all of them, in order to implement the greater selectivity and performance desired. Moreover, in providing these results it is desirable to provide permutatable circuits including switches which can be particularized for appliances, preferably with additional permutations for significantly different operational patterns with a restricted number of switches, and, where it is possible with a new permutation, to even reduce the number or size of switching elements involved.

It is manifest that regardless of the number of switches involved there must be as many pushbuttons or control elements as there are different functions, and these switches and their multiple connections are significant cost items related to both material and labor. The counterpart of the speed switching permutations are the number of coils in the stator, their relative impedances and the various combinations available for permutation.

Multiple switch assemblies generally employ a plurality of permutation slide bars which provide a permutation in one relationship heretofore opening all switches to turn "off" the motor. Under these circumstances, each switch must be capable of handling the make and break surge of the applied current.

THE PRESENT INVENTION

In the present invention the number of pushbuttons are desirably maximized, the number of switches and coils minimized, as further explained later, any by way of illustrating the invention more than two field coils of different impedances are illustrated for use with a two pole universal motor. Three coils in two windings are disclosed herein by way of illustration. The windings may be divided between the two poles of a closed stator or be a single winding upon the bight of a U-shaped stator core whose legs are the poles. In all embodiments the armature is magnetically coupled between two stator poles. In one embodiment however, the armature is electrically and magnetically coupled between two of the field coils. In another embodiment the armature is electrically coupled outside the field coils even though magnetically coupled between two of them. In still another embodiment, four coils are shown, as more particularly explained in the U.S. Pat. Ser. No. 780,103 to Swanke, with the armature electrically connected between two of the coils and three coils electrically connected on one side of the armature.

Preferably the coils are permutated and energized to provide significantly different speeds both with and without a diode in the circuit for AC operation and, alternatively, with or without a timer or homogenizer as described in U.S. Pat. Ser. No. 780,103 to SWANKE. Either the main switch or a separate switch is used to manually jog the motor momentarily with the speed permutation selected when the motor is stopped by the main switch or the timer switch.

An object of the invention is to provide circuit patterns in which two adjacent coils are connected in multiple speed relationships in which they may have their adjacent ends connected in series, or their like ends in both instances connected together, or their remote ends connected together in the motor circuit with a switch related to speed control in each connection.

A further object of the invention is to provide circuit patterns for varying the field impedance of plural field coils of different impedances with their adjacent ends selectively interconnected, with their like ends in one direction connected to one side of the power line and their like ends in the opposite direction connected in series with the armature for series, parallel and series-parallel or individual energization, or combinations thereof.

A further object of the invention is to interlock the switching in the above objects to prevent shorting any field coil that is not in the working circuit.

One of the objects of the present invention is to provide as many buttons as there are functions and with slide bars actuated thereby permutate switches to perform more functions than there are switches present including the dual use of the main shutoff switch slider for different functions in addition to shutoff.

A further object is to simplify the coil circuitry for maximum electrical permutation of all the coils with the armature disposed magnetically between two of the coils.

Other and further objects appear in the description taken with the embodiments shown in the drawings in which:

FIG. 1 is a fragmentary perspective view of a liquidizer and control including a multiple pushbutton switch embodying the invention.

FIG. 2 is a view similar to FIG. 1 showing another embodiment of the invention.

FIG. 3 is a side elevational view of the switch shown in FIG. 2.

FIG. 4 is a transverse sectional view of the switch shown in FIG. 3.

FIGS. 5, 6, 7 and 8 are enlarged views of the push rods employed to control the operation of the switch with FIGS. 5 and 7 showing transverse pairing in actuating and resting positions, respectively.

FIG. 9 is a partial electrical schematic view of the novel switch arrangement involved with two field coils in a universal motor.

FIG. 10 is a partial view of the switch operating portion of two cooperating sliders for controlling the switches shown in FIG. 9 including indication of the permutation of the switches and the resulting relationship of the coils, FIG. 11 is a fragmentary enlarged elevational view of a speed selector switch slider at a single switch station as constructed according to the invention to interengage a push rod and switch.

FIG. 12 is an electrical schematic of a representative circuit embodied in the present invention where the armature is connected electrically between two field coils.

FIG. 12A is a chart of eight possible fixed speed selections available with the circuit shown in FIG. 12, including a "-STOP" or "OFF" selection.

FIG. 12B is a composite view showing the configuration of the speed selector sliders of a switch embodying the invention in which "OFF" is provided by the two seed permutation sliders with a main switch for sequential switching.

FIG. 12C is a view supplementing FIG. 12B showing the substitute construction of the speed permutation sliders at the main switch station whereby "OFF" is provided by the main switch along with a setting of a predetermined fixed speed for jogging operation when the main switch is shunted.

FIG. 13 is an electrical schematic of another representative circuit embodying the present invention where the armature is connected electrically outside the field coils.

FIG. 13A is a chart of fourteen possible speeds of significant differences available with the circuit shown in FIG. 13 including a "STOP" selection.

FIG. 13B is a composite view of the switch engaging portions of the speed selector sliders employed with the circuit shown in FIG. 13 for eight speeds including "OFF."

FIG. 13C is a view similar to FIG. 13B for a diode doubling of the speeds provided in FIG. 13B and including a diode switch slider and a main switch slider.

FIG. 13D is a view supplementing FIGS. 13B and 13C whereby jogging can be accomplished by a critical "OFF" slider or the main switch slider, whichever may be available or desired for this purpose.

FIG. 14 is an electrical schematic of a circuit that supplements circuits shown herein for diode speed doubling and jogging embodiments.

FIG. 15 is a view similar to FIG. 14 showing a supplementing circuit in which a jogger shunts the diode and main switch sections of a speed control circuit. PP FIG. 16 is a view similar to FIG. 15 showing supplementing circuit in which a timer switch in series with the main switch is employed for jogging.

FIG. 17 is another electrical schematic view of a circuit embodying the invention it the armature electrically between two pairs of cowound coils.

FIG. 17A is a chart of seven speed permutations chosen from 16 possible permutations with the circuit of FIG. 17, and FIG. 17B is a view similar to FIG. 12C indicating the speed permutation slider construction for the embodiment of FIGS. 17A.

In FIG. 1 the base 10 of a universal motor driven liquifier is shown having a switch control panel 12, and a well known clover leaf shaped jar 14 with cutters (not shown) supported in operative position on the upper surface in a well-known manner by four upstanding guide supports 13. The panel 12 supports a multiple pushbutton switch 16 (FIG. 3) with one or two rows of pushbuttons 18 extending through the panel for selective actuation by the operator. Two rows are shown and at least seven seven buttons in each row are devoted to speed selection with five or six switches permutated thereby. One button shown as a composite button where two rows are provided, serves as a stop button 18S.

In addition to the multiple switch 16 a timer 24 is shown mounted on the panel for manual rotation of the dial 25 to close a switch 9 (FIG. 15) connected in series with the main switch 8 as later described which is closed when any one of the speed buttons 17 is pressed. A "jog" button 18J is reciprocable mounted in the center of the dial 25 and is large enough to be easily actuated yet recessed to avoid inadvertent actuation. In FIG. 2 the jog button is mounted in place of the timer and is connected to a switch 9 shunting the main switch, or it can actuate the main switch 8 itself as later described.

The general construction of the multiple switch 16 as shown in FIGS. 1 to 4 is somewhat conventional in that it has a hollow elongated housing 20 molded of suitable insulating material having an upright central portion 15 defining a slider chest 17 and having threaded holes 21 to receive mounting screw 23. The side walls 27 support the sliders 32 in an assembly for relative longitudinal reciprocation. Opposing vertical grooves 31 in the sidewalls 27 receive push rods 28 supporting the buttons 18 in guided relation here the extend upwardly from the slide chest through narrow slots 34 in the top of the central portion 15 for purposes of selective actuation. the switches numbered from 1 to 6 that are actuated by the sliders 32 are located below the sliders and comprise a row of stationary terminals 44 having downwardly facing fixed contact 43. Along the other side are other terminals 46 resiliently supporting one end of bridging conductors 48 whose other ends provide contact areas 47 urged to close against the stationary contacts 43 in an upward direction when free to do so. A flat cover plate 50 of insulating material is secured to the housing 20 by suitable mean to close the switch chamber with sufficient clearance to permit operation of the bridging conductors 48 and support the sliders with respect thereto.

The sliders 32 of the embodiment shown in FIG. 4 are shown as seven in number which includes one or two diode control sliders 32D as more particularly described in said Swanke and Raymond application. The remaining five sliders constitute four permutation switch sliders 32 and a main switch slider 32M. All are made of insulating phenolic board and are supported by extensions 52 (FIG. 11) spaced along their lower edges and slidably bearing against the cover plate 50 to carry the downward thrust of the push rods 28 actuating them. Between successive extensions 52 the sliders have recesses 54 at each switch station indicated by the conductors 48 and are provided with various shapes including cams to operate or not operate the conductors as their permutation required.

Generally, if a conductor 48 is to be actuated at a particular recess, the recess is provided with a cam contour having a short high swell 56 and a long low dwell 58 separated by a cam incline 60 which either closes the switch or opens it depending upon the relative location of the conductor and the direction of movement of the slider when actuated. Thus, when a switch is open the corresponding recesses 54 of the sliders are so arranged with respect to the switch conductors 48 that one or more high swells 56 of those present at that station engages the conductor to hold the switch open in a downward direction, and when a switch is to be closed the low wells 58 in all recesses 54 at that station coincide to permit the resilient conductor 48 to rise and close the contacts 43 and 47.

For permutation of the sliders 32 and thereby the switch closings, the upper edges of the sliders have notches 62 for each push rod 28. The notches generally define a vertical side 64 and a side inclined thereto to provide an actuated cam surface 66 for moving the slider in the direction indicated by the arrow (FIG. 11). In FIG. 12B full sliders are shown as described but for the sake of simplicity only the lower portions are shown in other views and arrows indicate the slider movement induced by the push rods at each notch 62 station.

Where a single row of pushbuttons 18 is provided in the switch, all push rods 28 for FIG. 11 are identical, being curled on the bottom end as at 29 to a cylindrical form.

Where a double row of pushbutton 18 is provided the push rods 28 for the permutation switches 40 are cross-paired to operate in the same notches 62 of the sliders 32 and for this purpose are constructed as shown in FIGS. 4—7. All are identical for inventory purposes and each comprises an L-sbaqed stamping 53 of heavy sheet metal notched at 55 in the top edge to receive the pushbuttons 18 and rounded along the bottom edge of their toe portions 65 to engage the permutation switch sliders 32 and are curled at 67 along their heel portion 57 where they slidable engage the respective diode slider 32D when engaging in their respective diode notches 62D. The toe portions 65 are flat so that two of them cooperate face-to-face (FIG. 7) in each permutation slider notch. The heel portion 57, having the curl 67, move in guided relation in the groove guideways 31 in the wall of the chamber 17.

A u-shaped push rod 61 (FIG. 8) for the main switch 8 may be used for the "STOP" button 18S and be provided with a rounded curled edge 67S extending the full length of the lower edge since the "STOP" button preferably is unitary and is secured to both vertical legs 28M of the push rods 61. To rectangular phenolic guide plates 31P are notched as at 63 to cooperate with the grooves 31 in rigidfying the operation of the push rods at their curled portions without deviation in the slider notches 62, and along their lower edges the guide plates are recessed as at 63A to guide the resilient conductors 48 and support them in their vertical movement against lateral displacement when cam actuated by the sliders, as more particularly described in said Swanke-Raymond application.

1. CIRCUIT WITH ARMATURE ELECTRICALLY BETWEEN FIELD WINDINGS

Referring now to FIG. 12, the possible field coil permutations for speed control are shown in relation to only six permutation switches which do not include an additional switches 7, 8 or 9 described later in connection with FIGS. 14, 15 and 16. It will be noted in the permutation chart of FIG. 12A that either one or more of the switches 4, 5 and 6 are involved in each permutation to provide eight selections and at no time is switch 5 closed when either or both of switches 4 and 6 are closed, thereby preventing coil shorting.

The coils are illustrated each having 120 turns, and by way of example coil A has 023 gauge wire, coil B has 024 gauge wire and coil C has 029 gauge wire The armature has 55 turns in each coil of 028 gauge wire. B and C coils are cowound simultaneously so that turns of the C-coil nest in the interstices of the B-coil for compactness. Coil A can be connected to the power line $L_1$ by switches 1 and 2 at opposite ends thereof through connection 72 as shown in dotted lines in FIG. 12 and to a rotatable armature R through connector 73. Coil B is connected at its inner end in series with the armature R through connector 74 and at its opposite ends connected through switches 3 and 4 and connector 75 to terminal X. Coil C at its outer end is connected through said connector 75 and at its inner end is connected in series with coil B through switch 5, and also in series with the armature R by connector 76 having switch 6 in it.

The impedance provided by the respective coils is represented by the gauge size of the conventional copper field-coil wire employed in them as based upon their circular mils and when connected as indicated by the notation A(B/C) (FIG. 12A) by closed switches 1, 4, 6 the impedance of coil A in the circuit substantially equals the impedance of coils B/C in parallel. Accordingly, since the permutation of coils B/C in parallel is the same impedancewise as coil A alone it will be observed that switch 3, shown in dotted lines in FIG. 12, is no longer required because coil A can be used instead of B/C unless the relative impedance of the coils are changed. Thus the circuit component shown in FIG 9 is the right-hand portion of the circuit shown in FIG. 12 as later discussed.

a. Diode for Low Speeds.

Reference is made to FIG. 14 wherein an optional, but a preferable part of the circuit is shown having a diode section 68 shunted by switch 7 and connected in the circuit between terminals X and $L_2$ of FIG. 12. This is provided to double the number of speed selections available by selectively changing the full wave current across the motor to a half-wave electrical potential when the switch 7 is opened.

The diode section 68 shown in FIGS. 14 and 15 may be provided with the jogging switch 9 shunting both the main switch 8 and the diode (FIG. 14) by connections 70 so that the motor can be manually energized momentarily at high speed if desired.

b. Main Switch and Sequential Switching.

In addition, a main switch 8 is preferably shown for sequential switching which may be in series either with the diode and the speed permutation circuit or with the circuit alone. In the latter case the "STOP" and "START" function is preferably allocated to the main switch as noted in the description of the FIGS. 12B and 13B.

All permutation sliders and the diode slider are provided with protuberances 59 in their respective main switch notches 54M as shown in FIG. 12B so that the main switch is momentarily opened each time the switch permutations are changed as further described in said Swanke-Raymond application, reference to which is hereby made, it being noted in FIG. 12B that the main switch slider recess cam 60M and opening dwell 56M are elongated more than the dwells 56 for the speed selector switches so that sequential switching is accomplished with the main switch 8 which is operated to open before and close after the permutation switches 1—7 whereby the main switch takes the surge of making and breaking the electrical current while the permutation switches can be light switches which merely carry the current when closed.

c. Jogging.

In order to attain the ultimate desired results with a liquidizer there are occasions when a person wants to energize the motor momentarily at any speed by holding a switch closed manually for as long as desired to perform or complete an operation that is being carefully watched. This is true even though a timer is used. The timer may be set a little short and the motor jogged several times to complete the task to the operator's satisfaction. This can be done by reenergizing the motor. However, if it is not a repeat of the same speed, it preferably is a preselected speed generally one of the top speeds with which the operator becomes familiar for jogging. The jogger comprises a switch 9 (FIGS. 14—16) normally urged to its open position by a compression spring 71 (FIG. 15) disposed on a push rod between the pushbutton 18J and the panel 12 through which the push rod extends.

In FIG. 16 the section received between connections X and $L_2$ is a timer-jogger section 68A in which a normally open timer switch 9 is connected in series with main switch 8 and is opened by a timing mechanism 72 and closed momentar. y by the jogging button 18J. The motor is operated by the main switch 8 and timer switch 9 being closed concurrently, the motor starts when the last switch is closed if both are not closed simultaneously. Then when the timer runs down, the timer switch is opened leaving the main switch closed and the speed permutation remaining as selected. Thus, if the motor should be momentarily energized to complete or finalize an operation, the energization of the motor will be at the same speed. There is no operator consternation at unexpectedly finding different speed than that which was being used.

d. Speed Selection with FIG. 12.

Considering now the possible speed selections, there are eight different coil patterns out of nine possible permutations (FIG. 12A) which can be controlled with the five switches 1, 2, 4, 5 and 6 of FIG. 12 from which any speed can be selected by switch permutations. A further permutation may be provided in which switches 4, 5 and 6 or 1 and 2 are opened when the "STOP" button is pressed and the sliders are so arranged to move accordingly. Thereby, five switches (FIG. 12B) provide eight speed permutations (FIG. 12A) which are significant for speed control and can include the "OFF" condition.

These possible speed permutations can be doubled in number by the use of the diode 68 as noted, and the use of a main switch slider 32M provides sequence switching, also provides for the use of a timer, and the use of the jogger with or without the timer.

With only eight pushbuttons, the possible permutations require a selection of speeds with or without the diode for the most significant speed changes, and by way of assistance in understanding the invention the following analysis is provided because there are other factors that can be considered and are favorably available in the selection and design of the switch 16.

In event it is desired that the motor speed control circuit energized both poles at each and every speed then with dual field windings the permutations BC, B/C, B and C, may be omitted leaving four speeds remaining in the circuit shown in FIGS. 9 and 10. With these four permutations absent, switch 2 and its connections can be removed and a direct connector substituted for switch 1, thus leaving only three switches 4, 5 and 6 for the four permutations, plus a "STOP" button. These four permutations basically provide four speeds with three switches and both stator poles are energized each time (FIG. 10).

In the switching pattern one or more of the switches 4, 5 and 6 are involved each time and as shown in FIGS. 9 and 10, they can be handled by two permutation sliders (32A and 32B). This provides a novel pattern already mentioned in which one switch (5) interconnects the B and C coils at their electrically adjacent ends, another switch (6) connects one of these ends to the armature R, and the third switch (4) connects the other one of these ends to the power source.

This pattern can be controlled with only four cams 60 on the two sliders 32A and 32B as shown in FIG. 10, and since, as already noted, switch 4 is never closed with switch 5 and switch 5 is never closed with switch 6, but switches 4 and 6 can be closed together, the upper slider cams switch 4 open while closing switch 5 when moved in one direction indicated by the left directed arrows, and opens switch 5 while closing switch 4 when moved in the other direction indicated by the right directed arrows. The lower slider 32B closes switch 5 when switch 6 is opened with right-hand movement of the lower slider and closes switch 5 when switch 4 is open with left-hand movement, thereby providing a switch permutation pattern of 46, 4, 5 and 6 which in turn involves coils B/C, B, BC and C. This relation is a building block for switch circuit patterns and the permutation slide control thereof. To these permutations coil A is designated as being in the circuit for each. With a diode present as further described these speeds can be doubled to eight speeds but there would be no "OFF" position with eight pushbuttons present in the embodiment illustrated. Accordingly AB is omitted when the diode is in the circuit because coil combinations AB and A (B/C) provide the least difference in impedance, and a cam indicated in dotted lines 60S in the lower slider shown in FIG. 10 is provided for the benefit of the "OFF" button when both sliders are moved in a right-hand direction. The cam 60S can be located in either the number 4 switch recesses or symmetrically in the number 6 switch recess in the upper slider depending on the relative electrical positions of coils C and B in the circuit with the arrows remaining the same.

The coil combination BC is substituted without coil A in the upper range of speed changes and with proper location of the notches 62 actuating the sliders as shown in FIG. 12B the sequence corresponding to the rank-rating of speed significance of the switch and coil permutations can be provided for the pushbuttons with a diode in the three lower speeds, as follow.

| 1 | 2 | 3 | 4 | 5 | 6 | 7 | OFF |
|---|---|---|---|---|---|---|---|
| ABC | AC | $A\frac{B}{C}$ | ABC | BC | AC | $A\frac{B}{C}$ | OFF. |
| 15D | 16D | 146D | 15 | 25 | 16 | 146 | |

Except for speed BC in this system all speeds include coil A, and except for coil A all speeds can be handled with two sliders having the switch cams as indicated and shown in FIG. 10. In switching out coil A from the circuit the two switches 1 and 2 are required for BC and one addition slider 32X (FIG. 12B) with two cams 60 is provided which opens switch 2 and closes switch 1 except when speed button 5 is pressed whereupon switch 2 is closed and switch 1 is opened for that speed only.

The diode slider 32D is provided for opening the diode shunting switch 7 when speeds 1, 2 and 3 are selected as indicated by the three left directed arrows shown on the diode slider (FIG. 12B). Otherwise the switch is left closed by movement of the slider in the direction of the right directed arrows thereon at the recesses 62 for speeds 4 to 7.

These four sliders can then provide seven speeds and an "OFF" position selected from 16 permutations.

In addition to the diode slider, the "OFF" or main switch slider is provided in which actuation of any pushbuttons other than the "OFF" button 18S permits the switch 8 to operate with a delayed closing by movement of the slider 32M in the direction of the left directed arrows while the "OFF" button opens switch 8 by movement of the slider 32M in the direction of the right directed arrow shown thereon.

The "OFF" button also actuates the two permutation sliders the same as if speed button 7 were pressed, and depending on the direction of incline in the "OFF" notch of the diode slider 32D the diode can either be brought into the circuit for a low speed or shunted out for the high speed 7 setting. Thereafter, whenever the "OFF" button is pressed, the main switch is opened and a predetermined speed permutation is set up in the switch so that manual actuation of the jogger switch 18J (FIG. 14) can energize the motor at the set speed as long as the jogger switch is held closed.

With a jogger switch provided as at 18J the cam shown in dotted lines 60S (FIGS. 10, 12B) is omitted, a main switch slider is employed to break the circuit by the "OFF" button, and the speed control sliders 32A and 32B are shifted to their high speed permutation when the "OFF" button is pressed, the cam surfaces 66 in the recesses at the "OFF" station being provided as shown in lines 66E (FIG. 12C) to correspond with those present at speed station 7 for actuation when the main switch is opened. Then when the jogger button 18J is actuated to shunt the main switch, the motor will be energized at high speed as long as the jogger is manually held depressed.

Where a timer 24 is employed it is preferred to leave the speed switch sliders in their last speed when a jogger switch 18J is present. Thus when the timer opens the timer switch the speed permutations sliders are left in their last set position and the "OFF" button need not be actuated to disturb or change the jogging speed. The jogging switch is manually closed as long as desired.

The multiple switch thus provided as shown in FIGS. 15 and 16 can be used with or without the jogger since the "OFF" permutation does not interfere with the operation of the switch whenever a speed permutation button is pressed, and the presence of the "OFF" permutation with light permutation switches merely carries current as intended when the jogger switch makes and breaks the current.

2. CIRCUIT WITH FIELD COILS CONNECTED ELECTRICALLY TO ONE SIDE OF ARMATURE

Reference is made to FIG. 13 for the same analysis and use of the building block pattern of FIG. 9 as described in connection with FIG. 12. Like numerals refer to like parts and it is to be noted that the two circuits are shown with the same coils A, B and C, the same number of switches, and the armature is magnetically disposed between coils A and B. However the electrical difference is that the three coils are electrically connected on one side of the armature and the pattern for switches 4, 5 and 6 relating to coils B and C can be repeated in switches 1, 2 and 3 for coils A and B to greatly increase the speed permutations available for selection With the same motor components and without a diode there are at least 13 coil permutations usable with the six switches (FIG. 13A), as compared with eight permutations for five switches in FIG. 12A. Furthermore, by visual comparison of charts FIGS. 12A and 13A, these 13 include all of those available with FIG. 12A.

Dropping coil A in favor of B/C, the versatility of the six switches for 13 permutations for speed selections is greatly enhanced both for the single field winding of these coils on a U-shaped stator and dual windings on two-pole stators. The coil permutation choices are shown in FIG. 13A where, in addition to the description already made of the connections of coils B and C and switches 4, 5 and 6, the same pattern applies also to coils A and B and switches 1, 2 and 3.

The series connection 78 between coils A and B includes the switch 2 while the same end of coil A is connected to terminal X through connector 80 which includes switch 1 and connector 75. The same end of coil B and the other end of coil A are interconnected by a connector 82 which includes switch 3. Said other end of coil A is directly connected to the armature by connector 84. Sliders 32A₁ and 32B₁ have the same cam pattern in their notches 54 at the switch stations 1, 2 and 3 as sliders 32A and 32B have in their notches for switches 4, 5 and 6. At least three important coil permutations A/B/C, A/B and A/C are possible over FIG. 12B with both poles magnetically energized, and, there are no speeds omitted which are available with FIG. 12B. This provides a novel combination of the four speeds for two sliders provided in FIG. 12B plus at least an additional four speeds with two more sliders for switches 1, 2 and 3 which total six switches. In brief, it will be noted by chart FIG. 13A, that one or more of the switches 4, 5 and 6 are used in all but one coil permutation, and one or more of the switches 1, 2 and 3 are used in all of the coil permutations. Thus the importance of the triple switch pattern shown in FIG. 9 between the coils is further emphasized for versatility accommodating even further additional field coils.

Further versatility is found in varying the exact location of switch 4 between its two positions shown in FIGS. 9 and 12 and also the exact location of switch 3 for FIG. 13 as correspondingly related to the two positions of switch 6 in FIGS. 9 and 12. For instance if (AB/C) is desired instead of A(B/C) (switches 2, 4, 6 in FIG 13) then switch 3 can be located in the vertical lead to coil B from connection 82 and (AB/C) would be provided by switches 2, 4, 6 in FIG. 13. Also if C(A/B) is desired of (BC/A) (switches 1, 3, 5 in FIG. 13) then switch 4 can be located in connection 75 with connector 80 leading directly to the coil B and switches 1, 3, 5 would provide the substitution in FIG. 13.

Here again the diode section shown in FIGS. 14 and 15 can be connected between terminals X and L₂ if desired in which case the same speeds can be provided as already described in connection with the circuit of FIG. 12B and likewise the diode-jogging circuit of FIG. 13, or the time-jogger circuit of FIG. 16.

Diode Operation In Fourteen Speed Embodiment.

In event, however, a double row of pushbuttons is employed to provide 14 speeds, half of which are provided with the use of a diode, the coil permutations could be selected as follows:

| Permutation | ABC | AC | AB | AB/C | A/BC | A/B | A/B/C |
|---|---|---|---|---|---|---|---|
| Switches closed | 25 | 26 | 24 | 246 | 135 | 134 | 1,346 |

Reference is made to said Schwanke-Raymond application with regard to two rows of pushbuttons and to the use of two diode sliders for actuating the diode switch to open the diode switch by the low speed range buttons and to close the diode switch by the high speed range buttons.

In the present invention a single diode slider is employed in which the incline 60 in the diode switch recess 54D is eliminated and a shoulder 80 is employed as a latch element between the high dwell 56D and the elongated lower dwell 58D. The conductor 48D in the diode switch 7 in this instance is formed with a vertical side 82 to provide the other latching element and squarely abuts against the shoulder in latching relationship when the diode switch 7 is closed. A spring 84 interengaging the diode slider and the end wall 85 of the slider chest 17 urges the diode slider 32D in the direction moving the shoulder against the conductor whereby the high dwell 56D may slip under the conductor 48D and hold switch 7 open whenever the conductor is raised to dispose the diode in the circuit. Otherwise both the resiliency of the conductor and that of the spring 84 urges the continuance of the latch engagement against dislodgement by vibration. Raising the conductor is accomplished by movement of the switch permutation slider 32, all of which have protuberances 59 in their notches 54 at the diode station and anytime a slider is moved its protuberance 59 lifts is conductor to open switch 7.

The diode slider 32D is actuated only by the row of low speed pushbuttons along with the permutation sliders 32 and when this is done the slider protuberances 59 lift the conductor whereupon the diode slider is moved by spring 84 to the left as viewed in FIG. 13C so that the high dwell is moved in under the lifted conductor to hold the switch 7 open.

On the other hand when any pushbutton is actuated in the high speed row the diode slider recesses 62D are engaged and while the same protuberances raise the conductor 48D the high speed pushbuttons move the diode slider to the right to remove the high dwell 56D from under the conductor 48D and this allows the conductor to close the switch 7 and shunt out of the diode. As the high speed button is released after being pressed the diode slider is urged to engage the conductor with the shoulder 80 and establish the latching relationship discussed which holds the switch closed. Each time a high speed pushbutton is pressed this sequence of relative movement occurs so that the latching relationship is renewed each time a high speed button is pressed to remove any creep that may have occurred under vibration during the previous setting.

Jogging With Slider Operation.

Although permutation sliders can be relied upon at appropriate recesses thereon to open the switches 1, 2 and 3 or 4, 5 and 6 with the assistance of the added dwell 60S as already described, as shown in FIG. 13b when the "OFF" pushbutton is pressed, it is preferred to incorporate a main switch and an added slider 32M for the "OFF" operation and in conjunction therewith provide sequence switching as already described. Accordingly, although the description which follows is related to an additional slider to operate the main switch it applies also to any one of the permutation sliders devoted to controlling the main switch when the "OFF" button is pressed.

In addition to the upper recess that is engaged by the "OFF" push rod 28M which moves the main switch slider 32M to the left as viewed in FIG. 13C whereby the switch conductor is cammed to open the switch 8 with the first movement of the slide bar, another recess spaced therefrom is provided on the upper side of the slider and comprises a slot 90 therein inclined downwardly in the opposite direction in which the slider moves to close the main switch. A pushbutton 18J is carried on the push rod 28J which has a tongue or blade 91 on the lower end that is similarly inclined and is located so that the lower edge 92 is directly above the throat of the slot 90 when the main switch 8 is closed. The push rod is spring-urged upwardly by a coiled spring 71 around its shank as bottomed on the top of the housing 15 around the guide opening 34J to engage a washer 95 below the button secured to the exposed upper end of the push rod.

As a safety factor, it is only when the main switch slider is in its switch opening position that the lower edge 92 will enter the slot 90 when the plunger is actuated, but when it does enter and is pushed the full distance the slider moves to close the main switch whereupon the motor is energized at any speed for which the sliders are set. When the pushbutton is released, the spring returns the plunger upwardly and the back of the blade 91 cams the slider back to its "OFF" position to again open the main switch.

In view of the sequence that the motor has to be turned "OFF" before the jogger pushbutton 18J can be operated, both physically and functionally, there is no danger in leaving a particular permutation ready when the main switch is turned "OFF." Any playing with the permutation switch buttons will only start the motor as though it were in use after which it would be turned "OFF" again. The pushbutton 18J need only have the burden of turning the main switch "ON" and "OFF" and in doing this rapidly will not disturb the permutation sliders when they are in "ready" condition, or after they have been made ready when a speed pushbutton is pressed down the first time.

Referring now to FIGS. 17, 17A and 17B a further illustration of the versatility of the invention is shown wherein the building block circuit of FIGS. 9 and 10 are duplicated on opposite sides of an armature R. In this embodiment the four switch permutation sliders not only provide the speed permutations of the coils but also operate the diode switch for some of the speeds and preset the switches for a jogging speed when the stop button is pressed. Switch 8 is not required unless it serves as a main switch for sequential switching already described or as the jogging switch.

The field coils are 120 turns each, of the wire gauges shown, A 029, B 024, C 025 and D 028. Coils A and B are cowound and coils C and D are cowound and the switches for each pair of coils follow the configuration shown in FIG. 9. Both coils are connected in parallel between one side of a power source and the armature by connections 75 and 76, each connection having a single throw switch in it. Each pair of coils is connected in series by a connection having a third single throw switch in it, and a fourth switch is connected in parallel with one of the other switches to serve as a jogger switch 19.

The operation of the three switches is controlled by sliders 32 having the same configuration as shown in FIG. 10 whereby the series switch 5 is never closed when either or both of the parallel switches are closed as already described. Thus, there are available with FIG. 17 16 usable speed permutation selections all including energization of both stator poles. Of these 16 speeds, seven have been selected as shown in FIG. 17, one speed (A(C/D) being used twice, once with switches 146 closed as an operative speed and the other as a high jogging speed with switches 4 and 6 closed and switch 1 open.

In accomplishing this relationship a cam and high dwell is provided on slider 32A₁ as shown at 60S in FIG. 17B which opens switch 3 while switch 1 is being opened by slider permutation. Thus, all switches 1, 2 and 3 are opened by moving both sliders 32A and 32B, towards the left by the OFF button while the switches 4 and 6 are closed by sliders 32A and 32B. In this relationship the motor is stopped and no current will flow through the motor until a jog switch 3 is closed shunting any one of the switches 1, 2 or 3. In the embodiment illustrated, switch 1 is the switch chosen to be closed because it completes the permutation of a high speed. Either one of switches 2 and 3 could be used if a slower speed were desired.

Considering the use of the diode 68 it is to be noted that all high speed switch permutations only use the combination of switches 4 and 6 in them and this is attained by moving the two sliders 32A and 32B in opposite directions as indicated by the arrows at the pushbutton speed stations OFF, 5, 6 and 7. This relative movement of sliders is employed to close the diode pushbutton by the use of high dwells 60D shown on sliders 32A and 32B cooperating with the diode switch 7. Thus, whenever the switches 46 are closed, the diode switch 7 is also closed shunting out the diode to provide full wave current.

It will be appreciated from this that any other single permutation switch could be used with the jog switch 9 and that any particular combination of two switches which exists only with high or low speeds could be used to control the diode, such a 13, or 2 or 5 The diode cam dwells would be located accordingly either to open or close the diode switch depending on the orientation desired.

Having thus described embodiments of the invention illustrating the inventive concept in which three switches for a pair of field coils of different conductance magnetically on the same side of an armature provide four permutations with four cam dwells on two sliders in which one switch is not closed whenever either one or both of the other two switches are closed and including a permutation in which the pair of field coils are connected in parallel.

It will be noted how several modifications in the use thereof can be made to provide at least eight possible permutations which can be doubled by the use of a diode or at least 14 possible permutations, 28 with a diode, where three coils having different conductivities are electrically connected on the same side of the armature, without departing from the spirit of the invention.

What we claim is:

1. In a speed control for a fractional horsepower universal motor having an armature and stator, the combination of a plurality of cowound field coils of different impedances on the stator of the motor,
    a second switch having a movable conductor between two of the coils to connect the coils in series between one side of a power source and the motor armature,
    a connection between the two coils including a first switch having a movable conductor to shunt one of the coils and said second switch,
    a connection between the two coils including a third switch having a movable conductor to shunt the other of the coils and said second switch,
    a multiposition switch control means interengaging said switch conductors, and
    selective manual means for moving said switch control means to one of its positions to close said first and third switch conductors and open said second switch conductor concurrently.

2. The combination called for in claim 1 in which said manual means moves said switch control means to a second position to open said first and third switch conductors and close said second switch conductor concurrently.

3. The combination called for in claim 2 in which said manual means moves said switch control means to a third position to close the first switch conductor and open said second and third switch conductors concurrently.

4. The combination called for in claim 2 in which said manual means moves said control means to close the third switch conductor and open said first and second switch conductors concurrently.

5. The combination called for in claim 1 including a third field coil on the stator and
    a connection between one of the said two coils and said third coil including a fourth switch having a movable conductor engaged by said switch control means to connect the third coil in series with said two coils,
    a connector between said third coil and one of said two coils including a fifth switch having a movable conductor engaged by said switch control means to bridge said fourth switch and said third coil, and
    said switch control means controlling said fourth and fifth switch conductors to open one and close the other of said fourth and fifth switches concurrently.

6. The combination called for in claim 5 in which said fifth switch is in series with one of the first two mentioned connections.

7. The combination called for in claim 5 including a connection between the other one of said two coils and said third coil and including a sixth switch having a movable conductor engaged by said switch control means to shunt said other one of said two coils and said fourth switch.

8. The combination called for in claim 7 in which the conductor of said sixth switch is in series with one of the first two mentioned connections 9. The combination called for in claim 1 in which the armature and said field coils are connected in series relation with one side of a source of power and including a third field coil,
means connecting the armature between one of the ends of the third coil and one of the other coils,
connections including fourth and fifth switches having conductors independently connecting the armature and the other end of said third coil respectively in series with the other side of said source of power, and
means controlling said fourth and fifth switch conductors to open one while closing the other of said fourth and fifth switches concurrently.

10. The combination called for in claim 9 in which said switch control means includes another manual means actuating said means controlling the fourth and fifth switches to close the conductors of said fifth switch concurrently with said second and third switches and opening the conductors of said first and fourth switches.

11. The speed control called for in claim 1 in which said two coils are electrically connected on one side of the armature and field coil winding are connected in series between the other side of the power source and the motor armature and whose impedance remains constant for a range of speeds, and
said permutations of series and parallel connections energize the same number of field coil turns at a plurality of fixed speeds within said range of speeds.

12. The combination called for in claim 1 in which said switch conductors are rated only to carry the current consumed by said coils,
switch means connected in series with said switches having a conductor rated to make and break as well as carry said consumed current, and
said switch control means controlling said switches to close said switch conductors before closing said switch means conductor and to open said switch conductors while said switch means conductor is open.

13. The combination called for in claim 1 in which said switch control means moves all three switches to their open positions to deenergize the circuit.

14. The combination called for in claim 1 including a manually moved, normally held open switch bridging at least one of said switches and connected in series with at least one of said coils for energization of said motor.

15. The combination called for in claim 1 in which said switch control means includes a fourth switch and a current rectifier connected in parallel with each other and in series with said coils, dual manual switch actuators for said control means, one actuator opening the conductor of the fourth switch and the other closing the conductor of the fourth switch.

16. The combination called for in claim 1 in which said switch conductors are normally closed switch conductors.

17. The combination called for in claim 1 in which the plurality of field coils are cowound with their wires in parallel and of the same lengths.

18. In a speed control for a fractional horsepower universal motor the combination of a plurality of field coils on a stator electrically connected serially in a circuit including an armature magnetically coacting with said stator,
an electrical connector between adjacent ends of the coils including a second switch having a movable conductor to connect them in series,
an electrical connector interconnecting one of said adjacent ends of one coil to the other end of the other coil including a first switch having a movable conductor connecting said one coil in series with the armature,
an electrical connector interconnecting the other one of the adjacent ends to the other end of said one coil including a third switch having a movable conductor connecting said other coil in series with the armature,
a first manually actuated control means for actuating said conductors and independently movable between alternate positions to provide four permutation cooperatively,
said control means alternately closing the first and third switch conductors while opening the second switch conductor to connect said coils in parallel in one position and opening the first and third switch conductors while closing said second switch conductor to connect the coils in series in the alternate position,
a second manually actuated control means coordinated with the movement of said first control means alternately to open said third conductor in one position and to close said third switch conductor in its other position when said first switch conductor is closed to connect said coils in said parallel relationship, and alternately to open said second switch in one position and close said second switch conductor in its other position when said first and third switch conductors are open to connect said coils in said series connection with the armature.

19. The combination called for in claim 18 in which one of said first and third connectors is opened by movement of one of the control means to OFF positions, and
resilient means including manual means actuating one of said control means to close at least one of said switch conductors momentarily.

20. The combination called for in claim 19 including a jogging switch means shunting one of said open switch conductors.

21. In a speed control for a fractional horsepower universal motor powered by alternating electrical current having an armature and stator, the combination of a plurality of field coils of different impedances on the stator serially connected in the motor circuit with the armature,
a switch having a normally closed movable conductor in the serial connection to open the connection between two of said coils,
a first switch means having a normally closed movable conductor bridging one of said coils and said switch,
a second switch means having a normally closed movable conductor bridging another of said coils and said switch,
a multiposition permutation switch control mean selectively opening said switch conductor in one position to leave the two coils connected in parallel to open said switch conductor, and either one of the switch means conductors for one coil in either one of two other positions, to leave the other coil individually in series with said armature, and to open both of said switch means conductors in another position to leave the coil serially connected in the motor circuit.

22. The combination called for in claim 21 including parallel connected current rectifier and third switch means having a normally closed conductor connected in series with at least one of said coils,
two selective manual means independently actuating said switch control means, one of said manual means opening said third switch means conductor and the other manual means releasing said third switch means for closure thereof.

23. A speed control system for a universal electric motor connectable across a source of alternating current comprising:
an armature,
a plurality of field coils of differing impedances disposed on one side of the armature,
first selective switch means to connect the field coils in series between the armature and one side of said source,
second selective switch means to connect like ends of each coil independently to said one side of said source for connecting at least two of said coils in parallel,
connector means having connections connecting the other ends of said coils separately and to the armature and including
switches in at least two of said connections for selecting the coils that will be connected in parallel between said armature and said one side of said source.